United States Patent [19]

Yamagami

[11] Patent Number: 5,661,628
[45] Date of Patent: Aug. 26, 1997

[54] FUSED SURFACE MOUNTING TYPE SOLID ELECTROLYTIC CAPACITOR

[75] Inventor: Mamoru Yamagami, Kyoto, Japan

[73] Assignee: Rohm Co. Ltd., Kyoto, Japan

[21] Appl. No.: 720,814

[22] Filed: Oct. 1, 1996

[30] Foreign Application Priority Data

Oct. 2, 1995 [JP] Japan ................................ 7-254885

[51] Int. Cl.$^6$ ................................................ H01G 9/00
[52] U.S. Cl. .................................... 361/275.4; 361/534
[58] Field of Search ........................... 361/275.1, 275.2, 361/275.4, 534

[56] References Cited

U.S. PATENT DOCUMENTS

| | | | |
|---|---|---|---|
| 4,935,848 | 6/1990 | Yamane et al. | 361/534 |
| 5,424,909 | 6/1995 | Kuriyama | 361/534 |

FOREIGN PATENT DOCUMENTS

| | | | |
|---|---|---|---|
| 63-84010 | 4/1988 | Japan | H01G 9/12 |
| 2-105513 | 4/1990 | Japan | H01G 9/12 |
| 7-29780 | 1/1995 | Japan | H01G 9/12 |

*Primary Examiner*—Bot L. Ledynh
*Attorney, Agent, or Firm*—Michael D. Bednarek; Kilpatrick Stockton LLP

[57] ABSTRACT

A fused surface mounting type solid electrolytic capacitor is provided which includes a capacitor element, a safety fuse wire, and a package enclosing the capacitor element together with the fuse wire. The capacitor element includes a capacitor chip and an anode wire projecting downwardly from the chip toward the bottom surface of the package. The safety fuse wire is electrically connected to the chip and bent to extend downwardly toward the bottom surface of the package. An anode-side terminal electrode is formed on the package to extend from a first side surface of the package to the bottom surface in electrical conduction with the anode wire, while a cathode-side terminal electrode is formed on the package to extend from a second side surface of the package to the bottom surface in electrical conduction with the safety fuse wire.

8 Claims, 6 Drawing Sheets

FUSED SURFACE MOUNTING TYPE SOLID ELECTROLYTIC CAPACITOR

BACKGROUND OF THE INVENTION

1. Field of the Invention

The present invention relates to a solid electrolytic capacitor such as tantalum capacitor or aluminum capacitor. More specifically, the present invention relates to a surface mounting type solid electrolytic capacitor which incorporates a safety fuse wire which breaks upon an excessive temperature rise and/or upon passage of an overcurrent.

2. Description of the Related Art

A prior art surface mounting type solid electrolytic capacitor incorporating a safety fuse wire is disclosed in Japanese Patent Application Laid-open Nos. 63-84010 and 2-1055103 for example. Specifically, the prior art capacitor comprises a capacitor element and a resin package enclosing the capacitor element. The capacitor element has a chip electrically connected to a cathode lead through a safety fuse wire, and an anode wire connected directly to an anode lead. The anode and cathode leads project out of the package from opposite side surfaces thereof and are bent toward the underside of the package.

In use, the prior art capacitor can be conveniently mounted to a surface of a printed circuit board by soldering the projecting portions of the respective leads, and the resulting fixation can be rendered very firm. However, the presence of the two leads makes the size and weight of the capacitor correspondingly large, which is contrary to the general need for a size reduction while realizing a capacitance increase for a given size. Further, the existence of the leads also adds to the manufacturing cost.

In view of these problems, Japanese Patent Application Laid-open No. 7-29780 discloses a leadless solid electrolytic capacitor. Specifically, the leadless capacitor disclosed in this Japanese document comprises a capacitor element which has a capacitor chip and an anode wire projecting from the chip. The capacitor element is enclosed in a resin package with the tip of the anode wire exposed at a first side surface of the package. A safety fuse wire is connected to the chip of the capacitor element and has a tip exposed at a second side surface of the package opposite to the first side surface. The first side surface of the package is covered by an anode-side terminal electrode in electrical conduction with the exposed tip of the anode wire, whereas the second side surface is covered by a cathode-side terminal electrode in electrical conduction with the exposed tip of the fuse wire.

Apparently, the leadless capacitor described above is advantageous in that the absence of leads contributes to a reduction of size, weight and manufacturing cost while realizing a capacitance increase. However, since only the first and second side surfaces of the package on which the respective terminal electrodes are formed can be utilized for soldering at the time of mounting the capacitor to a circuit board, there is a weakness with respect to the bonding strength of the soldering.

On the other hand, it is necessary either to decrease the thickness (diameter) of the fuse wire or to increase the length of the fuse wire for improving the melt-cut characteristics thereof. Of these two requirements, a thickness decrease will result in difficulty of bonding the fuse wire to the capacitor chip. Thus, the only possible solution is to increase the length of the fuse wire. However, according to the structure of the prior art leadless capacitor, since the fuse wire is made to extend straight from the chip to the second side surface of the package, the package or the capacitor as a whole need be elongated to increase the length of the fuse wire for improving the melt-cut characteristics thereof, consequently resulting in an increase of size and weight of the capacitor.

SUMMARY OF THE INVENTION

It is, therefore, an object of the present invention to provide a fused surface mounting type solid electrolytic capacitor which can eliminate or reduce the above-described problems of the prior art.

According to the present invention, there is provided a fused surface mounting type solid electrolytic capacitor comprising: a capacitor element including a capacitor chip and an anode wire projecting from the chip, the chip being formed with a cathode electrode; a safety fuse wire electrically connected to the chip; a package enclosing the capacitor element together with the fuse wire, the package having a bottom surface, a first side surface extending upwardly from the bottom surface, and a second side surface also extending upwardly from the bottom surface at a position opposite to the first side surface; an anode-side terminal electrode formed on the first side surface of the package in electrical conduction with the anode wire; and a cathode-side terminal electrode formed on the second side surface of the package in electrical conduction with the safety fuse wire;

wherein the anode wire extends downwardly toward the bottom surface of the package at a position adjacent to the first side surface thereof;

wherein the fuse wire is bent at least once to extend downwardly toward the bottom surface of the package at a position adjacent to the second side surface thereof;

wherein the anode-side terminal electrode is formed to extend from the first side surface of the package to the bottom surface thereof; and wherein the cathode-side terminal electrode is formed to extend from the second side surface of the package to the bottom surface thereof.

According to a preferred embodiment of the present invention, the anode wire projects downwardly from a bottom surface of the chip which is substantially in parallel to the bottom surface of the package, and an end of the anode wire is exposed out of the package at the bottom surface thereof but covered by the anode-side terminal electrode in electrical conduction therewith. In this embodiment, the anode wire may be partially embedded in the chip at a position offset toward the first side surface of the package.

According to another preferred embodiment of the present invention, the anode wire projects from a first side surface of the chip which is substantially perpendicular to the bottom surface of the package, and the anode wire is bent to extend downwardly toward the bottom surface of the package to have an end which is exposed out of the package at the bottom surface thereof but covered by the anode-side terminal electrode in electrical conduction therewith. In this embodiment, the fuse wire may be attached to a second side surface of the chip which is opposite to the first side surface of the chip.

In either of the preferred embodiments, the fuse wire may be further bent horizontally toward the second side surface of the package, and an end of the fuse wire may be exposed out of the package at the second side surface thereof but covered by the cathode-side terminal electrode in electrical conduction therewith.

Alternatively, the fuse wire may be bent only once, and an end of the fuse wire may be exposed out of the package at the bottom surface thereof but covered by the cathode-side terminal electrode in electrical conduction therewith.

The anode wire may be prepared separately from the chip and attached thereto at a position where the cathode electrode is not formed.

Other objects, features and advantages of the present invention will become apparent from the following description of the preferred embodiments given with reference to the accompanying drawings.

DETAILED DESCRIPTION OF THE PREFERRED EMBODIMENTS

Figure 1:
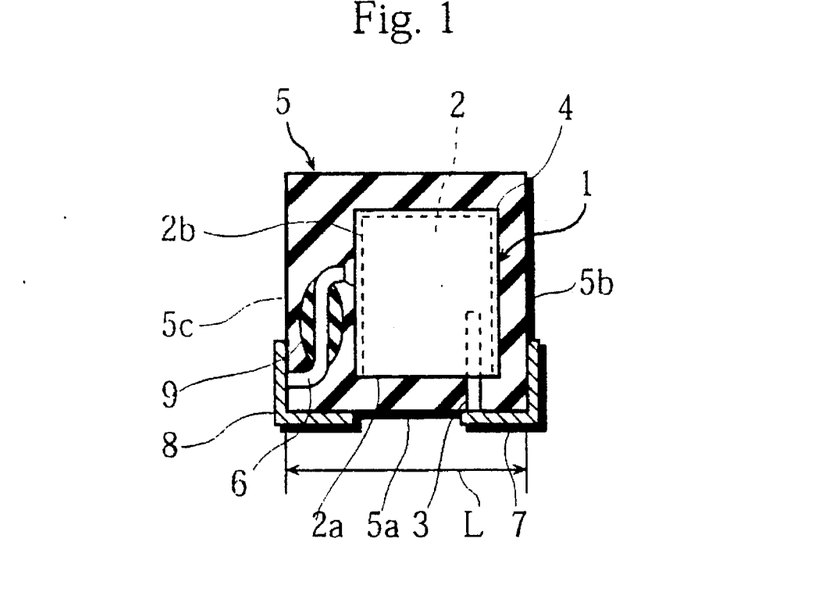
FIG. 1 is a view, in vertical section, showing a fused surface mounting type solid electrolytic capacitor according to a first embodiment of the present invention.
Figure 2:
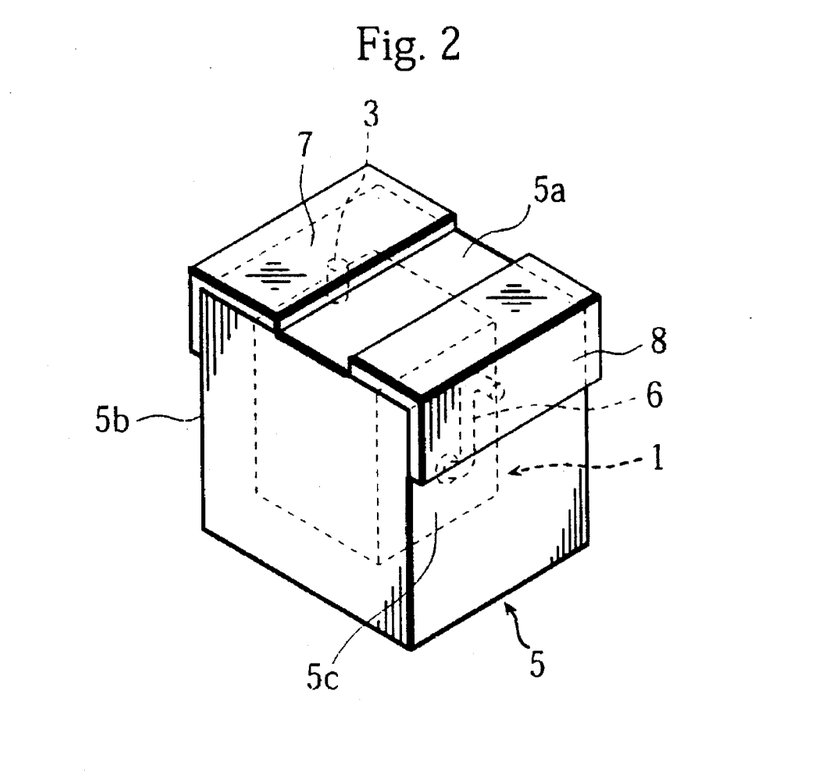
FIG. 2 is a perspective view of the same.

FIGS. 1 and 2 of the accompanying drawings illustrate a fused surface mounting type solid electrolytic capacitor according to a first embodiment of the present invention. In this embodiment, the capacitor is designed to be mounted on a surface of a circuit board (not shown) in a vertical or upright posture. The capacitor mainly comprises a capacitor element 1, a safety fuse wire 6 electrically connected to the capacitor element 1, and a molded resin package 5 enclosing the capacitor element 1 together with the fuse wire 6.

The capacitor element 1 includes a sintered chip 2 of compacted valve metal powder such as tantalum powder, and an anode wire 3 projecting downwardly from a bottom surface 2a of the chip 2. Though not specifically shown, the surfaces of the metal particles of the chip 2 are formed with a dielectric coating of e. g. tantalum pentoxide which, in turn, is coated with a solid electrolyte layer of e.g. manganese dioxide, as is well known in the art. Further, the outer surfaces of the chip 2 other than the bottom surface 2a are formed with a layer-like cathode electrode 4.

The resin package 5 may be made of a thermosetting resin such as epoxy. The package 5 is in the form of a cube or parallelepipedon having a bottom surface 5a substantially in parallel to the bottom surface 2a of the capacitor chip 2, a first side surface 5b extending vertically from the bottom surface 5a, and a second side face 5c also extending vertically from the bottom surface 5a at a position opposite to the first side surface 5b. The anode wire 3 of the capacitor element 1 projects downwardly at a position offset toward the first side surface 5b of the package 5 and is exposed at the bottom surface 5a of the package 5.

The fuse wire 6 may be made of solder to act as a temperature fuse for example. The fuse wire 6 is electrically connected to the cathode electrode 4 of the capacitor chip 2 at a side surface 2b thereof closer to the second side surface 5c of the package 5.

In the first embodiment, the fuse wire 6 is bent in a crank form to extend vertically downward and then horizontally outward to be exposed at the second side surface 5c of the package 5 close to the bottom surface 5a thereof. An intermediate portion of the fuse wire 6 is enclosed in an elastic resin member 9 which may be made of silicone for example.

A multi-layered anode-side terminal electrode 7 is formed on the resin package 5 to extend from the bottom surface 5a to the first side surface 5b in electrical conduction with the anode wire 3 of the capacitor element 1. Similarly, a multi-layered cathode-side terminal electrode 8 is formed on the package 5 to extend from the bottom surface 5a to the second side surface 5c in electrical conduction with the safety fuse wire 6.

In use, the above-described capacitor is placed on a surface of a printed circuit board (not shown) in an upright posture with the bottom surface 5a of the resin package 5 directed downward. In this condition, the anode-side terminal electrode 7 and the cathode-side terminal electrode 8 are soldered to corresponding bonding pads of the circuit board. Since each of the anode-side terminal electrode 7 and the cathode-side terminal electrode 8 extends from the bottom surface 5a of the package 5 to a respective one of the first and second side surfaces 5b, 5c thereof, the capacitor can be fixed firmly on the circuit board by utilizing both the bottom and side surfaces 5a, 5b, 5c of the package 5.

Further, since the fuse wire 6 is bent downwardly toward the bottom surface 5a of the package 5, the length of the fuse wire 6 can be elongated without increasing the length L (see FIG. 1) of the package 5 between the first and second side surfaces 5b, 5c, as opposed to the prior art wherein the fuse wire is made to extend in a straight form. Particularly, since the capacitor of the first embodiment is of the vertical or upright mounting type, the length L of the package 5 between the first and second side surfaces 5b, 5c can be additionally reduced.

The solid electrolytic capacitor of the first embodiment may be conveniently manufactured in the following manner.

Figure 3:
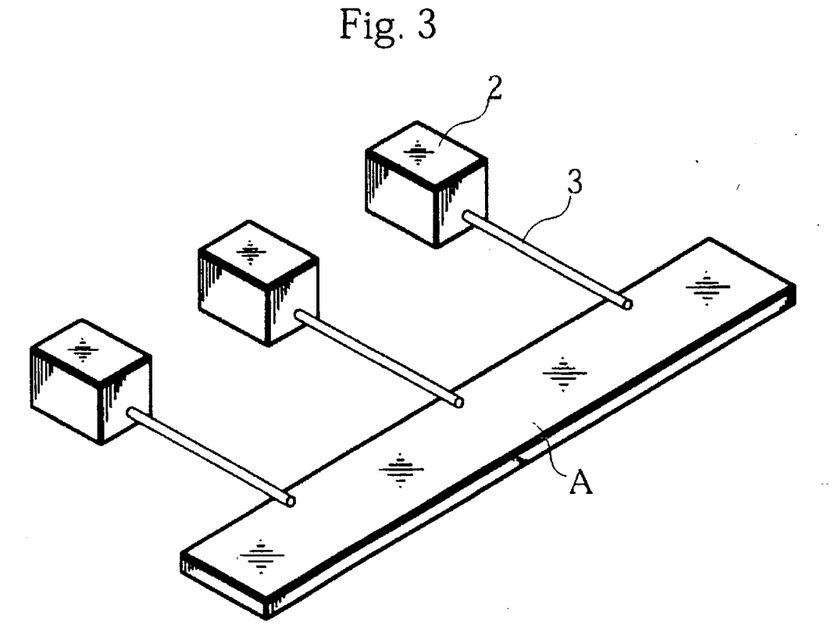
FIGS. 3 through 6 are perspective views showing the successive steps of making the same capacitor.
Figure 4:
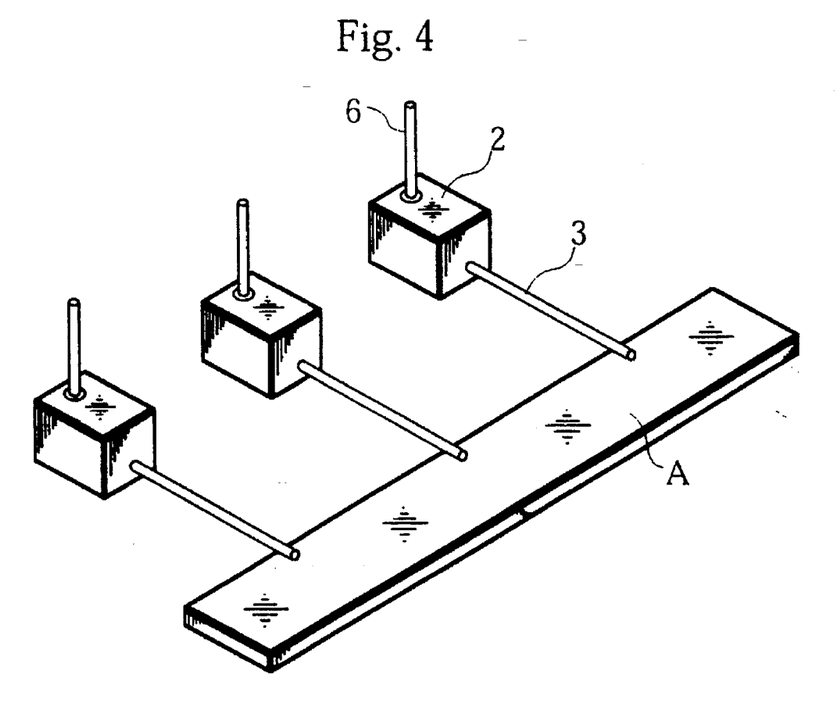

First, as shown in FIG. 3, a plurality of capacitor chips 2 each having an anode wire 3, are attached to a metal bar A by welding the anode wire 3. Each chip 2 comprises a sintered mass of compacted valve metal powder.

Then, each of the chip 2 suspended from the metal bar A is treated to form a dielectric coating of e.g. tantalum pentoxide on the metal particles of the chip by a known process step.

Then, each of the chip 2 is treated to form a solid electrolyte layer of e.g. manganese dioxide on the dielectric coating by a known process step.

Then, a multi-layered cathode electrode 4 (see FIG. 1) is formed on each of the chips 2.

Then, as shown in FIG. 2, a safety fuse wire 6 of e.g. solder is attached to each of the chips 2.

Figure 5:
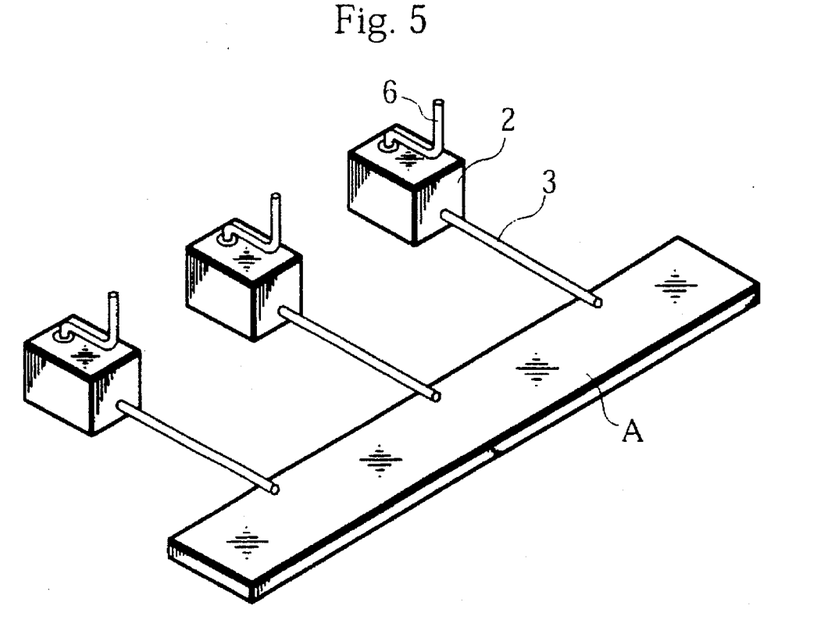

Then, as shown in FIG. 5, the fuse wire 6 is bent into a crank form.

Figure 6:
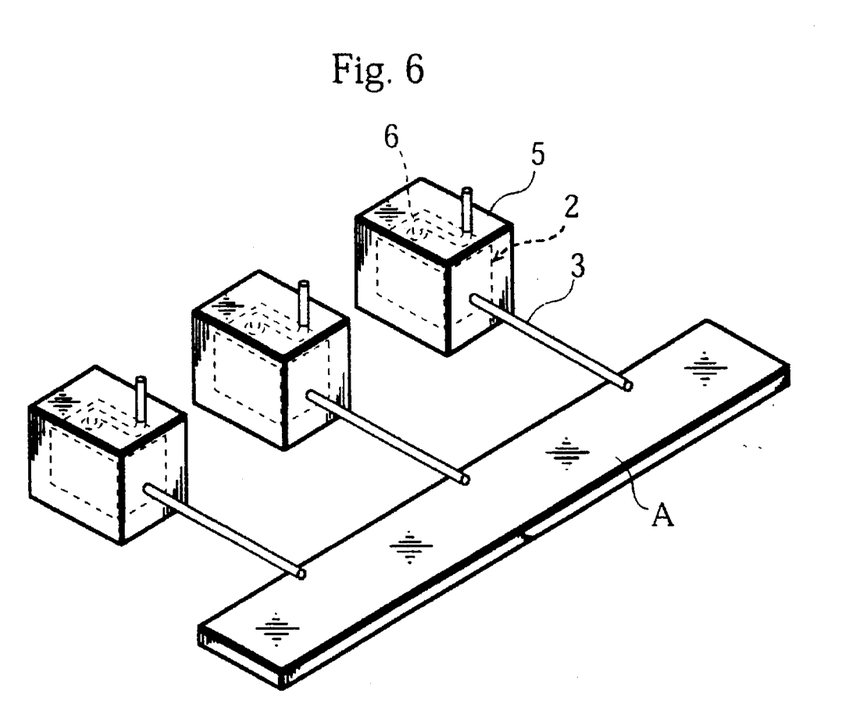

Then, as shown in FIG. 6, a resin package 5 is molded to enclose each of the chips 2.

Then, the anode wire 3 and the fuse wire 6 are cut at the bottom surface 5a and second side surface 5c (FIGS. 1 and 2) of the package 5 to have respective exposed ends which are subsequently polished.

Finally, a multi-layered anode terminal electrode 7 is formed to extend from the bottom surface 5a to first side surface 5b of the package 5, whereas a multi-layered cathode terminal electrode 8 is formed to extend from the bottom surface 5a to second side surface 5c of the package 5. Each of the terminal electrodes 7, 8 may be formed by first applying and baking a silver layer, forming a plated solder layer on the silver layer, and forming a plated nickel layer on the solder layer.

Figure 7:
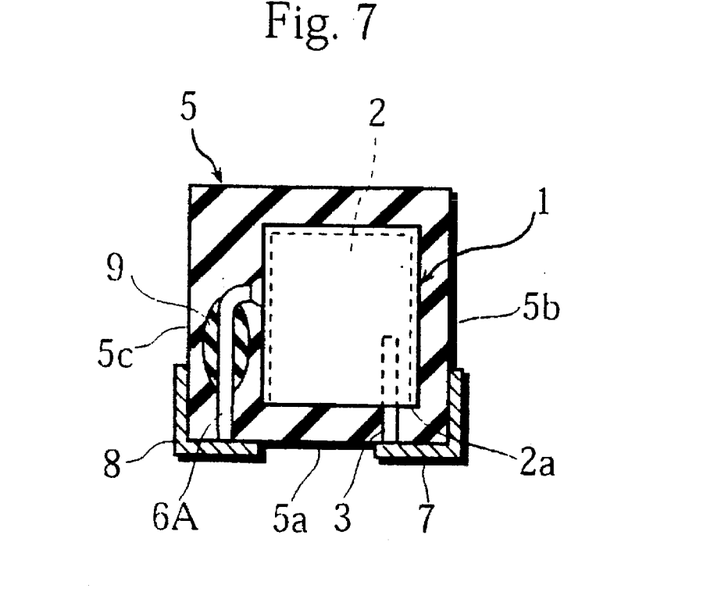
FIG. 7 is a view, in vertical section, showing a fused surface mounting type solid electrolytic capacitor according to a second embodiment of the present invention.

FIG. 7 shows a fused surface mounting type solid electrolytic capacitor according to a second embodiment of the present invention. The capacitor of this embodiment is similar to that of the first embodiment but differs therefrom only in that a safety fuse wire 6A is bent only once to extend vertically downward to be exposed at the bottom surface 5a of the resin package 5 adjacent to the second side surface 5c.

Figure 8:
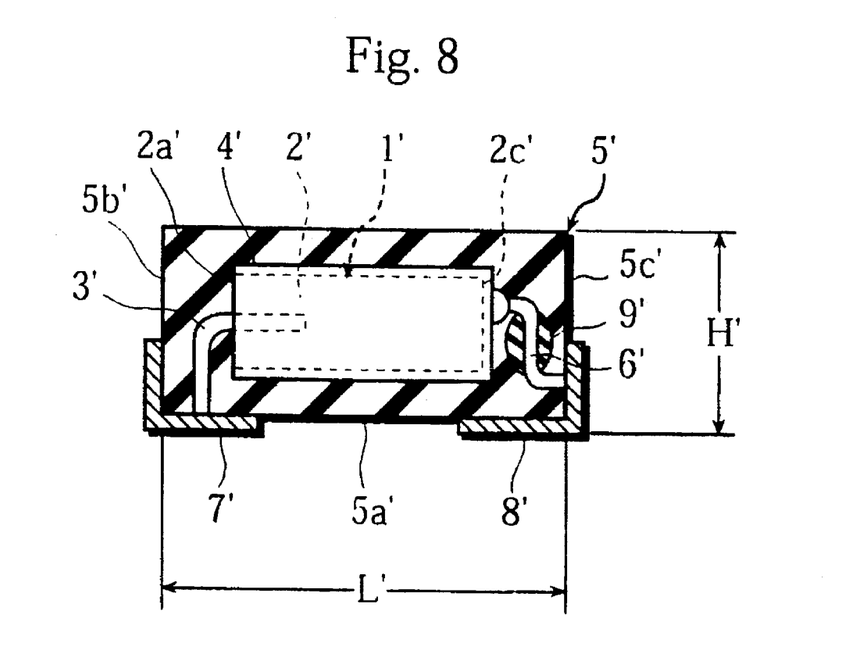
FIG. 8 is a view, in vertical section, showing a fused surface mounting type solid electrolytic capacitor according to a third embodiment of the present invention.
Figure 9:
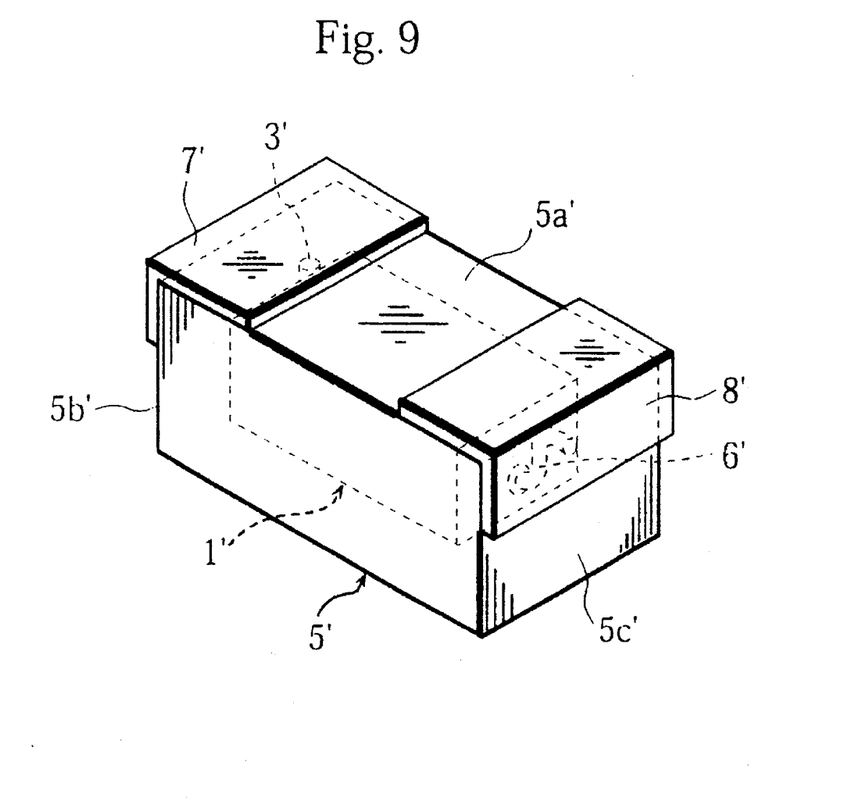
FIG. 9 is a perspective view of the capacitor illustrated in FIG. 8.

FIGS. 8 and 9 represent a fused surface mounting type solid electrolytic capacitor according to a third embodiment of the present invention. In this embodiment, the capacitor is designed to be mounted on a surface of a circuit board (not shown) in a horizontal or lying posture. Like the first embodiment, the capacitor mainly comprises a capacitor element 1', a safety fuse wire 6' electrically connected to the capacitor element 1', and a molded resin package 5' enclosing the capacitor element 1' together with the fuse wire 6'.

The capacitor element 1' includes a sintered chip 2' of compacted valve metal powder such as tantalum powder, and an anode wire 3' projecting from a first side surface 2a' of the chip 2'. The surfaces of the metal particles of the chip 2' are formed with a dielectric coating of e.g. tantalum pentoxide, and the dielectric coating is covered by a solid electrolyte layer of e.g. manganese dioxide, as is well known in the art. Further, the outer surfaces of the chip 2' other than the first end surface 2a' are formed with a cathode electrode 4'.

The resin package 5', which is in the form of a parallelepipedon, may be made of a thermosetting resin such as epoxy. The package 5' has a bottom surface 5a' extending substantially perpendicular to the first side surface 2a' of the capacitor chip 2', a first side surface 5b' extending vertically from the bottom surface 5a', and a second side face 5c' also extending vertically from the bottom surface 5a' at a position opposite to the first side surface 5b'. The anode wire 3' projecting from the first side surface 2a' of the chip 2' is bent downwardly to be exposed at the bottom surface 5a' of the package 5' adjacent to the second side surface 5b' thereof.

The fuse wire 6', which may be made of solder, is electrically connected to the cathode electrode 4' of the capacitor chip 2' at a second side surface 2c' opposite to the first side face 2a'. The fuse wire 6' is bent in a crank form to extend vertically downward and then laterally outward to be exposed at the second side surface 5c' of the package 5' close to the bottom surface 5a' thereof. An intermediate portion of the fuse wire 6' is enclosed in an elastic resin member 9' which may be made of silicone for example.

A multi-layered anode-side terminal electrode 7' is formed on the resin package 5' to extend from the bottom surface 5a' to the first side surface 5b' in electrical conduction with the anode wire 3' of the capacitor element 1'. Similarly, a multi-layered cathode-side terminal electrode 8' is formed on the package 5' to extend from the bottom surface 5a' to the second side surface 5c' in electrical conduction with the safety fuse wire 6'.

In use, the capacitor of the third embodiment is placed on a surface of a printed circuit board (not shown) in a lying posture with the bottom surface 5a' of the resin package 5' directed downward. In this condition, the anode-side terminal electrode 7' and the cathode-side terminal electrode 8' are soldered to corresponding bonding pads of the circuit board. Since each of the anode-side terminal electrode 7' and the cathode-side terminal electrode 8' extends from the bottom surface 5a' of the package 5' to a respective one of the first and second side surfaces 5b', 5c' thereof, the capacitor can be fixed firmly on the circuit board by utilizing both the bottom and side surfaces 5a', 5b', 5c' of the package 5'. Further, due to downward bending, the length of the fuse wire 6' can be elongated without increasing the length L' (see FIG. 8) of the package 5' between the first and second side surfaces 5b', 5c'. Moreover, due to the lying posture, the height H' of the package 5' can be made greatly reduced.

Apparently, the capacitor of the third embodiment may be conveniently manufactured substantially in the same manner as that of the first embodiment (FIGS. 3 through 6).

Figure 10:
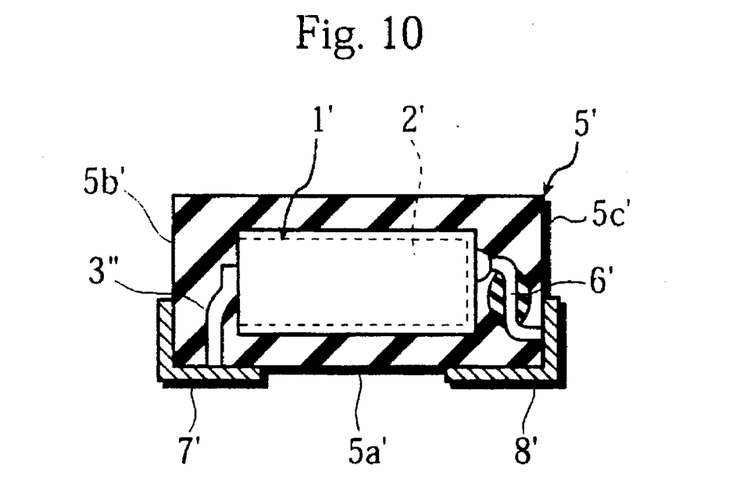
FIG. 10 is a view, in vertical section, showing a fused surface mounting type solid electrolytic capacitor according to a fourth embodiment of the present invention.

FIG. 10 shows a fused surface mounting type solid electrolytic capacitor according to a fourth embodiment of the present invention. The capacitor of this embodiment is similar to that of the third embodiment but differs therefrom only in that an anode wire 3" is prepared separately from the chip 2' and attached thereto before the chip 2' is treated for formation of dielectric coating and solid electrolyte layer.

Figure 11:
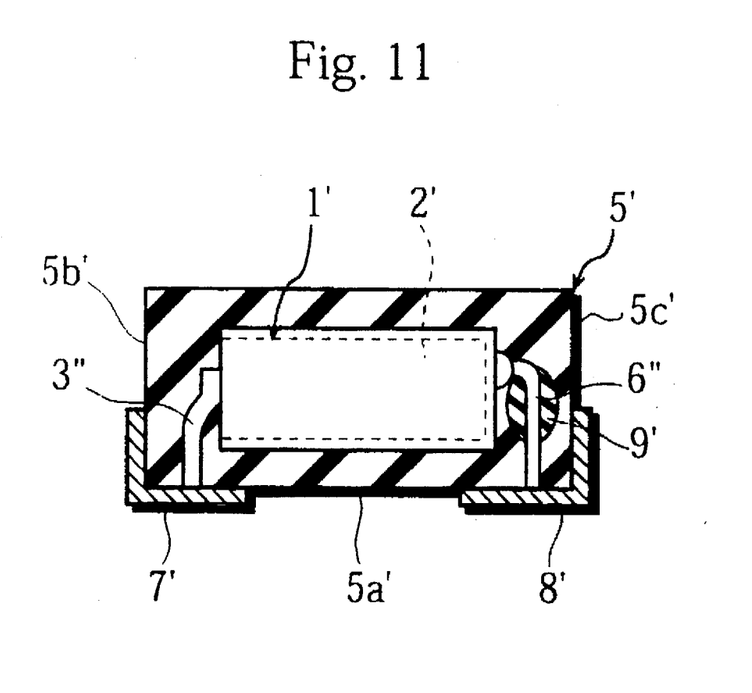
FIG. 11 is a view, in vertical section, showing a fused surface mounting type solid electrolytic capacitor according to a fifth embodiment of the present invention.

FIG. 11 shows a fused surface mounting type solid electrolytic capacitor according to a fifth embodiment of the present invention. The capacitor of this embodiment is similar to that of the fourth embodiment but differs therefrom only in that a safety fuse wire 6" is bent only once to extend vertically downward to be exposed at the bottom surface 5a' of the resin package 5' adjacent to the second side surface 5c'.

The present invention being thus described, it is obvious that the same may be varied in many ways. Such variations are not to be regarded as a departure from the spirit and scope of the invention, and all such variations as would be obvious to those skilled in the art are intended to be included within the scope of the following claims.

I claim:

1. A fused surface mounting type solid electrolytic capacitor comprising:

a capacitor element including a capacitor chip and an anode wire projecting from the chip, the chip being formed with a cathode electrode;

a safety fuse wire electrically connected to the chip;

a package enclosing the capacitor element together with the fuse wire, the package having a bottom surface, a first side surface extending upwardly from the bottom surface, and a second side surface also extending upwardly from the bottom surface at a position opposite to the first side surface;

an anode-side terminal electrode formed on the first side surface of the package in electrical conduction with the anode wire; and a cathode-side terminal electrode formed on the second side surface of the package in electrical conduction with the safety fuse wire;

wherein the anode wire extends downwardly toward the bottom surface of the package at a position adjacent to the first side surface thereof;

wherein the fuse wire is bent at least once to extend downwardly toward the bottom surface of the package at a position adjacent to the second side surface thereof;

wherein the anode-side terminal electrode is formed to extend from the first side surface of the package to the bottom surface thereof; and wherein the cathode-side terminal electrode is formed to extend from the second side surface of the package to the bottom surface thereof.

2. The capacitor according to claim 1, wherein the anode wire projects downwardly from a bottom surface of the chip which is substantially in parallel to the bottom surface of the package, an end of the anode wire being exposed out of the package at the bottom surface thereof but covered by the anode-side terminal electrode in electrical conduction therewith.

3. The capacitor according to claim 2, wherein the anode wire is partially embedded in the chip at a position offset toward the first side surface of the package.

4. The capacitor according to claim 1, wherein the anode wire projects from a first side surface of the chip which is substantially perpendicular to the bottom surface of the package, the anode wire being bent to extend downwardly toward the bottom surface of the package, an end of the anode wire being exposed out of the package at the bottom surface thereof but covered by the anode-side terminal electrode in electrical conduction therewith.

5. The capacitor according to claim 4, wherein the fuse wire is attached to a second side surface of the chip which is opposite to the first side surface of the chip.

6. The capacitor according to claim 1, wherein the fuse wire is further bent horizontally toward the second side surface of the package, an end of the fuse wire being exposed out of the package at the second side surface thereof but covered by the cathode-side terminal electrode in electrical conduction therewith.

7. The capacitor according to claim 1, wherein an end of the fuse wire is exposed out of the package at the bottom surface thereof but covered by the cathode-side terminal electrode in electrical conduction therewith.

8. The capacitor according to claim 1, wherein the anode wire is prepared separately from the chip and attached thereto at a position where the cathode electrode is not formed.

* * * * *